US009461348B2

(12) United States Patent
Stevens et al.

(10) Patent No.: US 9,461,348 B2
(45) Date of Patent: Oct. 4, 2016

(54) AQUEOUS ELECTROLYTE FOR LITHIUM-AIR BATTERY

(71) Applicant: ELECTRICITE DE FRANCE, Paris (FR)

(72) Inventors: Philippe Stevens, Noisy Rudignon (FR); Gwenaelle Toussaint, Nemours (FR); Florian Moureaux, Portieux (FR); Marian Chatenet, Meylan (FR)

(73) Assignee: ELECTRICITE DE FRANCE, Paris (FR)

( * ) Notice: Subject to any disclaimer, the term of this patent is extended or adjusted under 35 U.S.C. 154(b) by 0 days.

(21) Appl. No.: 14/357,446

(22) PCT Filed: Nov. 8, 2012

(86) PCT No.: PCT/FR2012/052576
§ 371 (c)(1),
(2) Date: May 9, 2014

(87) PCT Pub. No.: WO2013/068694
PCT Pub. Date: May 16, 2013

(65) Prior Publication Data
US 2015/0140453 A1 May 21, 2015

(30) Foreign Application Priority Data

Nov. 9, 2011  (FR) ..................... 11 60224

(51) Int. Cl.
*H01M 12/02* (2006.01)
*H01M 12/08* (2006.01)
(Continued)

(52) U.S. Cl.
CPC ............. *H01M 12/02* (2013.01); *H01M 10/26* (2013.01); *H01M 12/06* (2013.01); *H01M 12/08* (2013.01);
(Continued)

(58) Field of Classification Search
None
See application file for complete search history.

(56) References Cited

U.S. PATENT DOCUMENTS 4,001,043 A   1/1977   Momyer
4,057,675 A   11/1977  Halberstadt et al.
(Continued)

FOREIGN PATENT DOCUMENTS

CN   102 124 601       7/2011
DE       2507396 A1    8/1975
(Continued)

OTHER PUBLICATIONS

International Search Report mailed Mar. 19, 2013 corresponding to PCT/FR2012/052576.
(Continued)

*Primary Examiner* — Patrick Ryan
*Assistant Examiner* — Christopher Domone
(74) *Attorney, Agent, or Firm* — Vedder Price P.C.; Thomas J. Kowalski; Deborah L. Lu

(57) ABSTRACT

The present invention relates to an electrochemical device, in particular a lithium-air battery with an aqueous electrolyte, comprising: a negative electrode compartment containing lithium metal; a positive electrode compartment comprising at least one positive air electrode making contact with an aqueous solution containing lithium hydroxide; and a solid electrode separating, in a gas and fluidtight manner, the negative electrode compartment from the positive electrode compartment, characterized in that the aqueous solution containing the lithium hydroxide furthermore contains at least one additive decreasing the solubility of the lithium ions. The invention also relates to a method for storing and releasing electrical energy using a lithium-air battery according to the invention.

10 Claims, 2 Drawing Sheets

(51) Int. Cl.
*H01M 12/06* (2006.01)
*H01M 10/26* (2006.01)
*H01M 10/0567* (2010.01)

(52) U.S. Cl.
CPC ..... *H01M 10/0567* (2013.01); *H01M 2220/20* (2013.01); *H01M 2220/30* (2013.01); *H01M 2300/0014* (2013.01); *Y02E 60/124* (2013.01)

(56) References Cited

U.S. PATENT DOCUMENTS

| | | | |
|---|---|---|---|
| 4,677,040 A | 6/1987 | Specht | |
| 4,684,584 A | 8/1987 | Gordon | |
| 5,427,873 A | 6/1995 | Shuster | |
| 8,012,633 B2* | 9/2011 | Gordon | H01M 2/1646 429/101 |
| 8,323,820 B2 | 12/2012 | Visco et al. | |
| 8,389,147 B2 | 3/2013 | Visco et al. | |
| 8,455,131 B2 | 6/2013 | Visco et al. | |
| 8,568,921 B1 | 10/2013 | Johnson | |
| 8,592,092 B2 | 11/2013 | Suto | |
| 8,637,195 B2 | 1/2014 | Suto | |
| 8,658,304 B2 | 2/2014 | Visco et al. | |
| 8,673,477 B2 | 3/2014 | Visco et al. | |
| 8,981,723 B2* | 3/2015 | Suto | H01M 10/48 320/127 |
| 8,992,665 B2 | 3/2015 | Yamaguchi et al. | |
| 9,136,550 B2 | 9/2015 | Stevens et al. | |
| 9,178,221 B2 | 11/2015 | Toussaint et al. | |
| 2008/0070087 A1 | 3/2008 | Johnson | |
| 2010/0323249 A1* | 12/2010 | Fujiwara | C25B 9/10 429/403 |
| 2011/0294021 A1* | 12/2011 | Suto | H01M 12/02 429/403 |
| 2014/0050994 A1 | 2/2014 | Visco et al. | |
| 2016/0049679 A1 | 2/2016 | Stevens et al. | |

FOREIGN PATENT DOCUMENTS

| | | |
|---|---|---|
| DE | 2621931 A1 | 12/1976 |
| EP | 2 254 192 | 11/2010 |
| FR | 2 951 714 | 4/2011 |
| FR | 2952714 A1 | 4/2011 |
| JP | 01-093076 | 4/1989 |
| JP | 2010-176941 | 8/2010 |
| JP | 2011-081971 | 4/2011 |
| JP | 2011-134628 | 7/2011 |
| JP | 2011-195948 | 10/2011 |
| JP | 2012-526169 | 10/2012 |
| JP | 2013-508930 | 3/2013 |
| JP | 2013-069591 | 4/2013 |
| WO | WO 2009/104570 | 8/2009 |
| WO | WO 2010/128242 | 11/2010 |
| WO | WO 2011/051597 | 5/2011 |
| WO | WO 2011/070658 | 6/2011 |

OTHER PUBLICATIONS

First Office Action in corresponding Canadian Appl. No. 2,854,049 mailed Nov. 4, 2015.
First Office Action in corresponding Japanese Appl. No. 2014-540539 mailed Jun. 30, 2015.
First Office Action in corresponding Singapore Appl. No. 11201402072W mailed Jul. 21, 2015.
First Office Action in corresponding Chinese Appl. No. 201280054952.0 mailed Aug. 24, 2015.

* cited by examiner

US 9,461,348 B2

AQUEOUS ELECTROLYTE FOR LITHIUM-AIR BATTERY

TECHNICAL FIELD OF THE INVENTION

The present invention relates to an electrochemical device, in particular a lithium-air type battery with an aqueous electrolyte, as well as a method for storing and releasing electrical energy using a lithium-air battery according to the invention.

PRIOR ART

The energy density per unit mass (expressed in Wh/kg) of batteries is still the main factor limiting their use in portable appliances, such as portable electronics or electric vehicles. The limited energy density of these batteries is mainly due to the performance of the materials from which they are made. The best negative-electrode materials currently available generally have a specific capacity of between 300 and 350 Ah/kg. The specific capacity is only about 100 to 150 Ah/kg for positive-electrode materials.

The advantage of lithium-air systems is that the positive electrode has an infinite capacity. The oxygen consumed at the positive electrode does not need to be stored in the electrode but can be obtained from the ambient air.

The air electrode requires a basic or acidic aqueous medium to operate optimally. Unfortunately, the lithium metal used for the negative electrode reacts too strongly with water, and it is impossible for it to form in the presence of water during recharging because water reduces at voltages that are much too low, preventing lithium metal from forming. A watertight physical barrier is therefore required between the negative-electrode compartment, which is based on lithium metal, and the positive-electrode compartment containing an aqueous electrolyte. This watertight physical barrier must nonetheless selectively allow metal cations to pass from the aqueous electrolyte to the negative electrode and in the opposite direction.

Ceramic materials that meet these requirements, called "Li Super Ionic Conductors" (LISICON), have been known for some time. These materials have advantageously high conductivities ranging up to $10^{-4}$ or even $10^{-3}$ S/cm at 25° C. and have a good chemical stability with respect to the aqueous electrolyte in the positive-electrode compartment (air electrode). However, they react very strongly with the lithium metal in the anode compartment and it is essential to isolate them in a known way, from the lithium metal using a protective coating, for example a coating based on a lithium phosphorous oxynitride (LiPON) glass.

The first work done to develop a primary, i.e. nonrechargeable, Li-air battery dates from the 1970s (U.S. Pat. No. 4,057,675). These batteries suffered from high self-discharge and a short lifetime due to corrosion (reaction of the lithium with water). A battery delivering around 1.2 kW of power, composed of six modules was nevertheless constructed (W. R. Momyer et al. (1980), *Proc. 15th Intersoc. Energy Convers. Eng. Conf.*, page 1480). A rechargeable Li/$O_2$ battery without an aqueous phase, employing a polymer electrolyte containing a lithium salt, was also produced (K. M. Abraham et al. (1996), *J. Electrochem. Soc.* 143(1), pages 1-5). Employing a porous carbon-based positive electrode in this cell gave good results in terms of oxygen reduction, but this electrode was not adapted to oxidation during recharging. It was possible to implement only three cycles, and, to the knowledge of the Applicant, this work was complemented by two publications: Ogasawara et al. *Journal of the American Chemical Society* (2006) 125(4) 1393 and Kumar et al., *Journal of the Electrochemical Society* (2010) 157 (1): A50-A54.

During discharge of a lithium-air battery, the oxygen is reduced in the positive-electrode compartment ($O_2+4e^-+2 H_2O \rightarrow 4\ OH^-$), the alkali metal is oxidated in the negative-electrode compartment ($4\ Li \rightarrow 4\ Li^++4e^-$) and the alkali-metal ions thus formed migrate to the positive-electrode compartment where they can precipitate if their concentration reaches the solubility limit and form lithium hydroxide. The concentration of lithium hydroxide therefore increases in the aqueous electrolyte during discharge of the battery and decreases during charge of the battery when the alkali-metal ions migrate again to the negative-electrode compartment where they are reduced there and the hydroxyl ions are oxidated at the positive electrode.

The specific capacity of the battery thus depends solely on the capacity of the negative electrode and on the capacity of the battery to store the product of the oxygen reduction, i.e. the lithium hydroxide formed in the compartment of the positive electrode during discharge of the battery.

So that the battery has the highest possible specific capacity, it is desirable to strongly limit the volume of aqueous electrolyte and to use the most concentrated solutions possible.

However, the inventors have shown that the presence of lithium ions in the aqueous electrolyte has a blocking effect on oxygen release during recharge of the battery. This blocking effect had already been observed in the past, but in a very different context: lithium had been used in the aqueous electrolyte of nickel batteries as an additive to prevent oxygen release when this reaction competes with the reaction of nickel electrodes (Constantin et al. "The influence of some additives on the electrochemical behaviour of sintered nickel electrodes in alkaline electrolyte", *Journal Power Sources*, 74 (1998), 188-197). On the contrary, in the context of the present invention, and in particular in the context of lithium-air batteries, the blocking effect of the lithium ions is detrimental because it necessitates the application of an additional overvoltage across the terminals of the battery during recharge. The energy efficiency of the battery, i.e. the ratio (electrical energy flowing out of the battery when discharging electrical energy consumed to recharge the battery is thus decreased.

To improve the energy efficiency of the battery, it is therefore desirable to decrease the concentration of lithium ions in the aqueous electrolyte.

SUMMARY OF THE INVENTION

From these observations it transpires that the improvement in the specific capacity of the battery and in the energy efficiency of the battery seem to be two irreconcilable goals. In spite of this, the inventors have succeeded in improving the energy efficiency of a lithium-air type battery using an aqueous electrolyte without decreasing its specific capacity.

The subject of the present invention is a lithium-air battery comprising:
- a negative-electrode compartment containing lithium metal;
- a positive-electrode compartment comprising at least one positive air electrode in contact with an aqueous solution containing lithium hydroxide;
- a solid electrolyte separating, in a gas- and liquid-tight manner, the negative-electrode compartment from the positive-electrode compartment;

wherein the aqueous solution containing lithium hydroxide further contains at least one additive decreasing the solubility of the lithium ions.

The documents U.S. Pat. No. 4,684,584 and U.S. Pat. No. 5,427,873, which refer to an additive decreasing the solubility of lithium ions, relate to lithium-water cells and not lithium-air batteries. These cells are not intended to be recharged. The problem of energy efficiency does not therefore arise. Moreover, these cells do not comprise any positive air electrode.

The solubility of a compound denotes the maximum concentration of this compound that can be solubilized in a solvent. The additive present in the aqueous solution has the effect of decreasing the solubility of the lithium ions, and of decreasing the concentration of lithium $Li^+$ ions in an aqueous solution saturated with lithium.

The solubility limit of lithium hydroxide in water is 5.2 mol/L at 20° C. (according to D. R. Lido, *CRC Handbook of Chemistry and Physics*, New York, 2005). The presence of an additive according to the invention advantageously makes it possible to decrease this solubility limit of lithium hydroxide. The solubility limit of lithium hydroxide in the aqueous solution containing the additive is preferably below 4 mol/L, more preferably below 3 mol/L, and more preferably still below 2 mol/L. The solubility limit is however preferably maintained above 1 mol/L, at lower values issue of re-solubilization of the lithium hydroxide when recharging the battery can occur. Advantageously, the solubility limit of lithium hydroxide in the aqueous solution containing the additive according to the invention can lie between 1 mol/L and 2 mol/L.

This additive can be chosen by those skilled in the art from among the known chemical compounds having a solubility in water above the solubility of lithium and forming a salt with the hydroxide ions. Preferably, the additive is an alkali metal hydroxide. More preferably, the additive decreasing the solubility of the lithium ions is chosen from the group formed by potassium hydroxide and sodium hydroxide. More preferably still, the additive is potassium hydroxide.

The concentration of the additive decreasing the solubility of the lithium ions in the aqueous solution is fixed by those skilled in the art, as a function of the nature of this additive, so as to lower the solubility limit of lithium hydroxide down to the values described above. When the additive is potassium, its concentration in the aqueous solution containing lithium hydroxide can lie between 1 mol/L and 10 mol/L, more preferably between 4 mol/L and 9 mol/L, and more preferably still between 7 mol/L and 8 mol/L.

The additive can be added to the aqueous solution in any form. In particular, the additive can be added in the form of a hydroxide salt. If the additive is sodium, it is possible to add to the aqueous solution a sodium hydroxide salt. If the additive is potassium, it is possible to add to the aqueous solution a potassium hydroxide salt.

The inventors have observed that the presence of at least one additive according to the invention in the aqueous solution constituting the liquid electrolyte in a lithium-air battery has the effect of significantly reducing the charging voltage of the battery. Furthermore, the presence of the additive according to the invention has no impact on the energy released during discharge of the battery. As a consequence, the energy efficiency of the lithium-air battery is improved.

Another subject of the present invention is therefore the use of at least one additive decreasing lithium ion solubility to improve the energy efficiency of a lithium-air battery, the additive being contained in the aqueous solution containing lithium hydroxide constituting the liquid electrolyte of the lithium-air battery.

Furthermore, the presence of at least one additive according to the invention in the aqueous solution constituting the liquid electrolyte in a lithium-air battery has no prohibitive impact on the specific capacity of the battery. Indeed, if the concentration of the lithium hydroxide reaches and exceeds the saturation concentration, the alkali metal hydroxide precipitates. The formation of a precipitate is not problematic because, when the battery is being recharged, the precipitate can solubilise main and release the lithium ions. The lithium hydroxide precipitate thus constitutes a lithium ions reservoir.

It has however been observed in the past that just as lithium hydroxide precipitates in the aqueous electrolyte, a dense crystalline layer of lithium hydroxide can form at the surface of the solid electrolyte membrane. The presence of this dense layer, which cannot conduct cations, can provoke a very large increase in the cationic resistance of the system at the interface between the solid electrolyte membrane and the aqueous electrolyte.

Advantageously, the battery according to the invention has a means for preventing the formation of a dense crystalline layer of lithium hydroxide at the surface of the solid electrolyte.

The means for preventing the formation of a dense crystalline layer of lithium hydroxide at the surface of the solid electrolyte can be a organic cation-conducting polyelectrolyte layer. Such organic polyelectrolytes have for example been described in the patent application WO 2011 051597.

According to an advantageous embodiment, the subject of the present invention is a lithium-air battery containing,
  as the solid electrolyte, a alkali-metal cation conducting ceramic membrane, covered with an organic, insoluble and cation-conducting polyelectrolyte that is chemically stable in water with a basic pH, and
  as the liquid electrolyte, a lithium hydroxide aqueous solution of, in contact with said organic polymer, the aqueous solution containing lithium hydroxide, furthermore containing at least one additive decreasing the solubility of the lithium ions.

The negative-electrode compartment can comprise any electrode able to form lithium ions, for example a lithium metal electrode, an alloy electrode, for example lithium/silicon or lithium/tin, or an electrode of a insertions material, for example lithium/graphite. Preferably, the negative-electrode compartment comprises a lithium metal electrode, because of the high energy density of this type of electrode.

Positive air electrodes are known to the prior art. Generally, an air electrode has a solid porous structure, with a large specific surface area, in contact with the liquid electrolyte. The interface between the air electrode and the liquid electrolyte is a so-called "triple contact" interface at which the active material at the electrode, the gaseous oxidant and the liquid electrolyte are simultaneously present.

The positive air electrode is preferably designed to allow the triple contact between the electrolyte, the gaseous oxidant and the solid active material of the electrode. In principle, it can be chosen from among all those usually used in the art and described in particular in the article by Neburchilov et al. "A review on air cathodes for zinc-air fuel cells", *Journal of Power Sources*, 195 (2010), 1271-1291.

This preferably involves an electrode obtained by agglomeration of a carbon powder composed of carbon grains with a high surface area, such as Vulcan® XC72, marketed by Cabot. The specific surface area of carbon can be increased by reacting it with a gas such as $CO_2$, prior to its incorporation in the air electrode. Advantageously, the specific surface area of the carbon grains is high. Indeed, the higher it is, the higher the current density per unit of geometrical electrode surface area. The porous electrode is fabricated preferably by agglomeration of the carbon grains using a binding agent, which is preferably a hydrophobic fluoride polymer such as Teflon® PEP marketed by Dupont. A detailed description of an air electrode for a metal-air accumulator can for example be found in application WO 2000/036677.

Preferably, the positive air electrode further contains at least one oxygen reduction catalyst. This oxygen reduction catalyst is preferably chosen from the group consisting of manganese oxide and cobalt oxide.

The positive air electrode can further comprise an anion exchange polymer membrane forming a separation between the electrode material and the aqueous solution constituting the liquid electrolyte. Such membranes, which are for example described in the patent application WO 2010/128242, advantageously make it possible to protect the positive air electrode from deterioration due to the progressive carbonatation of the electrolyte.

Recharging a lithium-air battery using an alkali electrolyte in contact with the air electrode is carried out by reduction of $Li^+$ ion into lithium metal at the negative electrode (4 $Li^+$+4$e^-$→4 Li) and by oxidation of $OH^-$ ions at the positive electrode to produce molecular oxygen and water (4 $OH^-$→$O_2$+4$e^-$+2$H_2O$).

The oxygen-releasing reaction can be carried out directly on an air electrode, but the air electrode is designed and optimized for reducing an electrochemical reaction with a gas (oxygen of the air) and a liquid (the electrolyte). For this reason, this electrode is preferably porous, with the largest possible reaction surface area. This structure makes it more fragile and less suited to a reaction with a liquid only to produce a gas. Furthermore, the catalysts used in the air electrode fir improving the reaction of electrochemical reduction of oxygen in the alkaline electrolyte (manganese oxides or cobalt-based compound) are not stable at the more positive potentials required for the oxygen releasing reaction.

It is therefore preferable to use a second positive electrode which will be used during the battery recharging phases only.

The battery according to the invention can therefore further advantageously comprise a second positive oxygen releasing electrode, in contact with the aqueous solution containing lithium hydroxide. The second positive oxygen releasing electrode can, for example, be an electrode made of steel, preferably stainless steel, typically a 316L type steel, or a nickel electrode. In the battery, this electrode can typically have a grid-type or perforated plate-type structure, and it can be located between the negative electrode and the air electrode. The perforated structure of this electrode is used to ensure free passage of the components of the liquid electrolyte between the negative electrode and the air electrode during discharge.

According to an embodiment using a battery equipped with a second positive electrode, the first positive air electrode is decoupled during the phases of recharge of the battery. Charge is then carried out on the second positive oxygen releasing electrode. During the battery discharging phase, the second positive oxygen releasing electrode is decoupled and discharge is carried out on the first positive air electrode. The battery can be equipped with means for switching between electrodes, and possibly with a controlling means making it possible to control the switching. Such means are described for example in the patent application FR 11 54356.

Finally, one subject of the present invention is a method for storing and releasing electrical energy using a lithium-air battery according to the invention, comprising the following successive steps:

(a) a discharging phase during which the lithium metal contained in the negative-electrode compartment oxidates and precipitates in the form of lithium hydroxide in the aqueous solution of the positive-electrode compartment;

(b) a recharging phase during which the lithium hydroxide solubilizes to release lithium ions which are reduced at the negative electrode.

BRIEF DESCRIPTION OF THE DRAWINGS

The invention will be better understood in the light of the following non-limiting and purely illustrative examples, accompanied by the appended figures among which.

DETAILED DESCRIPTION OF THE INVENTION

Example

Preparation of the Liquid Electrolytes

Aqueous solutions saturated with lithium hydroxide and containing an additive according to the invention (here potassium) with a concentration varying from 1 M to 8 M were prepared according to the following protocol:

The exact masses of LiOH powder and KOH powder theoretically contained in the solutions were mixed. The mixtures were introduced into graduated flasks and water was added to the graduation line. The solutions were then mixed by magnetic stirring and ultrasounds. The solubilization of the compounds gave rise to an increase in the temperature of the solutions, which were naturally cooled to the laboratory temperature, T=25° C., because of this. The water level was topped up a second time, then the solutions were blended again by magnetic stirring. The solution/powder mixtures obtained were then filtered and the level of the electrolyte was topped up.

The various solutions were named $K_xLi_{Sat}$, where x is the theoretical concentration of the solution in potassium ions; $K_0Li_{Sat}$ refers to a solution saturated with LiOH without additive.

Effect of the Additive on the Decrease in Lithium Ions Solubility

The electrolytes thus prepared were analyzed by ICP-AES; they were diluted between 1 000 times, for the $K_0Li_{Sat}$ solution, and 10 000 times for the $K_8Li_{Sat}$ mixture. Details on the ICP-AES (*Inductively Coupled Plasma-Atomic Emission Spectrometry*) method of analysis can be found in the text "Handbook of Elemental Speciation: Techniques and Methodology", by Klaus G. Heumann.

Figure 1:
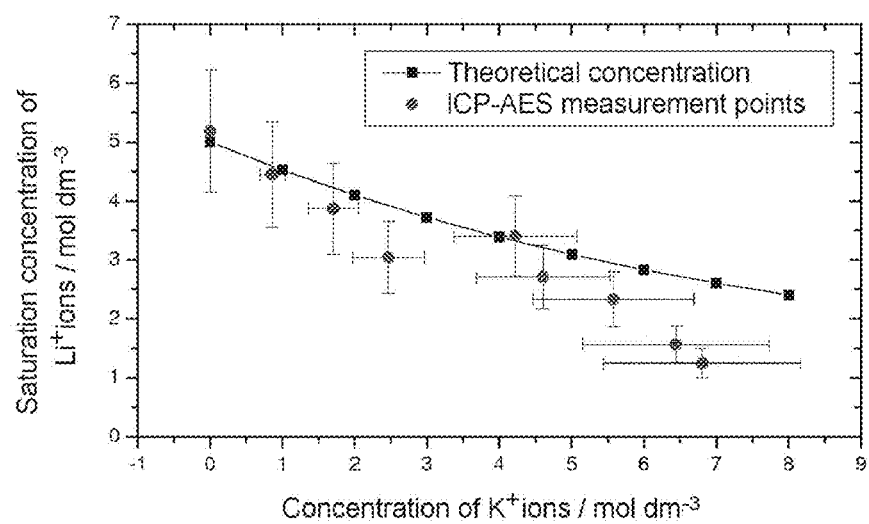
FIG. 1 is a graph representing the saturation concentration of $Li^+$ ions in solution as a function of the concentration of $K^+$ ions (theoretical concentrations and concentrations actually measured by ICP-AES)

FIG. 1 shows the saturation concentrations of $Li^+$ ions of the solutions as a function of their concentration of $K^+$ ions. Up to an approximate concentration of 6 M of potassium ions in solution, the theoretical values are in agreement with experimental values. Once this value of $K^+$ ion concentration is exceeded, the concentration of $Li^+$ ions falls drastically with respect to the theoretically defined value.

It is observed that the addition of potassium makes it possible to decrease the concentration of lithium ions in the aqueous solution saturated with lithium hydroxide.

The influence of the modification of the electrolyte on 316L steel fabrics with imposed current was measured. On the values shown below, the ohmic drop has been compensated for.

Effect of the Additive on the Oxygen Releasing Reaction Potential

The oxygen releasing reaction potentials were measured after 30 minutes of operation at 33 mA·cm$^{-2}$ on 316L steel fabrics. A new electrode was used on each run in order to avoid being disturbed by changes due to the development of a catalytic layer at their surface.

Figure 2:
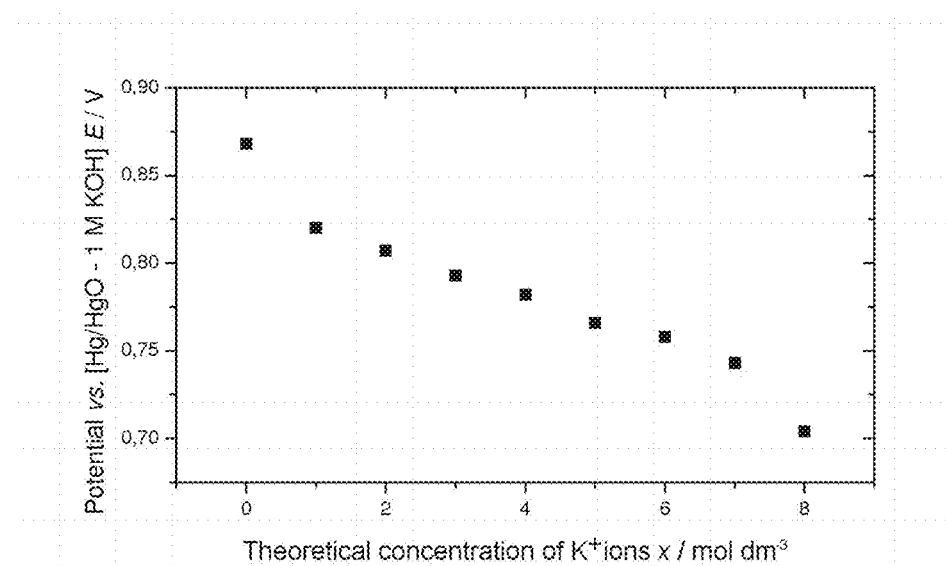
FIG. 2 is a graph representing the oxygen evolution reaction (OER) potential, measured at 33 mA·cm$^{-2}$, on an unactivated steel fabric as a function of the theoretical concentration of $K^+_x$ ions in the electrolytic mixtures $K_xLi_{Sat}$ (T=25° C.; Surface area=3.14 cm$^2$; measurements performed after 30 minutes of operation)

FIG. 2 illustrates the evolution of the oxygen evolution reaction (OER) potential, measured at 33 mA·cm$^{-2}$, on an unactivated steel fabric as a function of the theoretical concentration of $K^+_x$ ions in the electrolytic mixtures $K_xLi_{Sat}$ (T=25° C.; $S_{geo}$=3.14 cm$^2$; measurements performed after 30 minutes of operation).

Figure 3:
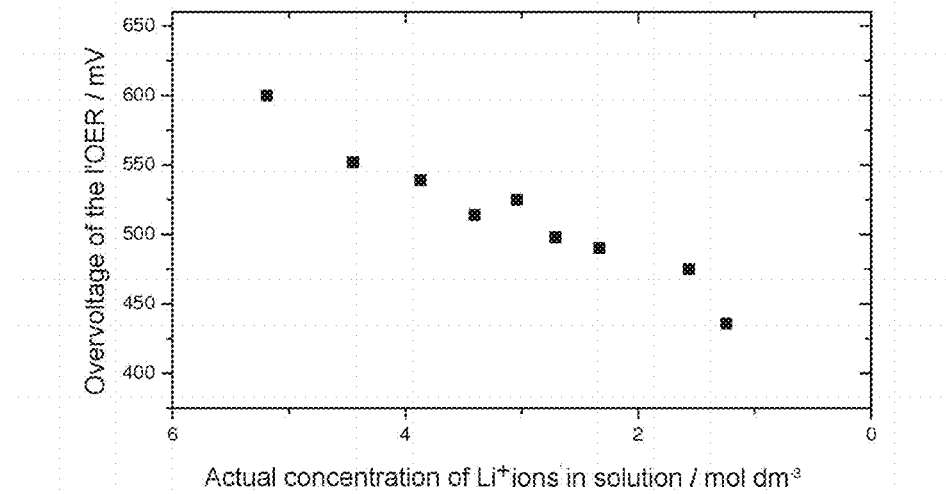
FIG. 3 is a graph representing the overvoltage of the OER, at 33 mA·cm$^{-2}$, as a function of the actual concentration of $Li^+$ ions in solution (T=25° C.; Surface area=3.14 cm$^2$; the values were acquired after 30 minutes of operation).

FIG. 3 illustrates the evolution of the overvoltage of the OER, at 33 mA·cm$^{-2}$, as a function of the actual concentration of $Li^+$ ions in solution. The standard potential of the reaction was determined in aqueous solution saturated with lithium hydroxide at 270 mV vs. [Hg/HgO–1 M KOH] (T=25° C.; Surface area=3.14 cm$^2$; the values were acquired after 30 minutes of operation).

It is noted that the presence of the additive according to the invention in the aqueous electrolyte has the effect of decreasing the overvoltage at the terminals of the electrode during the oxygen releasing reaction.

Effect of the Additive on the Energy Losses of the Oxygen Releasing Reaction

The measurements of the electrocatalytic performance of an electrode of 316L steel have been recorded in quasi-stationary mode on a turning disk electrode (TDB) of a geometric surface area 0.19 cm$^2$ (T=25° C.; $v_b$=0.1 mV; $S_{geo}$=0.19 cm$^2$)).

It has been observed that the use of an additive in the electrolyte makes it possible to reduce the OER potential, whatever the electrode current. The differences are all the more marked when the concentration of additive in the mixture is higher, but also when the electrode current is higher.

The various kinetic parameters of the electrode of 316L steel are summarized in table 1, according to the electrolytic medium used.

TABLE 1

| | Electrode potential E vs. [Hg/HgO – 1M KOH] at 33 mA cm$^{-2}$ | Electrode overvoltage $\eta_{O2}$ | Reduction of overvoltages |
|---|---|---|---|
| $K_0Li_{Sat}$ = aqueous solution saturated with LiOH | 868 mV | 598 mV | |
| $K_1Li_{Sat}$ | 820 mV | 550 mV | 8.0% |
| $K_2Li_{Sat}$ | 807 mV | 537 mV | 10.2% |
| $K_3Li_{Sat}$ | 793 mV | 523 mV | 12.5% |
| $K_4Li_{Sat}$ | 782 mV | 512 mV | 14.4% |
| $K_5Li_{Sat}$ | 766 mV | 496 mV | 17.1% |
| $K_6Li_{Sat}$ | 758 mV | 488 mV | 18.4% |
| $K_7Li_{Sat}$ | 743 mV | 473 mV | 20.9% |

The overvoltages $\eta_{O2}$ ($K_xLi_{Sat}$) were determined with respect to the standard potential $E°_{H2O/O2}$ in the aqueous solution saturated with UGH without additive ($\eta_{O2}$ of $K_0Li_{Sat}$). The standard potential $E°_{H2O/O2}$ (in aqueous solution saturated with LiOH without additive) was determined at 270 mV vs. [Hg/HgO–1 M KOH].

The reduction of the overvoltages was computed in the following manner:

$$\text{Value} = (\eta_{O2} \text{ of } K_0Li_{Sat}) - (\eta_{O2} \text{ of } K_xLi_{Sat})/\eta_{O2} \text{ of } K_0Li_{Sat}$$

In conclusion, the use of an additive in the aqueous electrolyte significantly reduces the overvoltage, and therefore the energy losses of the oxygen releasing electrode under current of systems of the type involving lithium-air batteries with aqueous electrolytes.

The invention claimed is:

1. A rechargeable lithium-air battery comprising:
    a negative-electrode compartment containing lithium metal;
    an aqueous solution containing lithium hydroxide and at least one additive, wherein the at least one additive is configured to set the solubility of the lithium ions below 4 mol/L;
    a positive-electrode compartment comprising at least one positive air electrode, in contact with the aqueous solution;
    a solid electrolyte separating, in a gas and liquid-tight manner, the negative-electrode compartment from the positive-electrode compartment.

2. The battery of claim 1, wherein the solubility limit of lithium hydroxide in the aqueous solution containing the additive is below 3 mol/L.

3. The battery of claim 1, wherein the additive setting the solubility of the lithium ions is an alkali metal hydroxide.

4. The battery of claim 3, wherein the additive setting the solubility of the lithium ions is chosen from the group made up of potassium hydroxide and sodium hydroxide.

5. The battery of claim 1, further comprising a layer of an organic cation-conducting polyelectrolyte as a means for preventing the formation of a crystalline layer of lithium hydroxide at the surface of the solid electrolyte.

6. The battery of claim 1, further comprising a positive oxygen releasing electrode, in contact with the aqueous solution.

7. The battery of claim 1, wherein the positive air electrode further comprises an anion exchange polymer membrane forming a separation between the electrode material and the aqueous solution constituting the liquid electrolyte.

8. A method for storing and releasing electrical energy using a lithium-air battery comprising:
    a negative-electrode compartment containing lithium metal;

an aqueous solution containing lithium hydroxide and at least one additive, wherein the at least one additive is configured to set the solubility of the lithium ions below 4 mol/L;

a positive-electrode compartment comprising at least one positive air electrode, in contact with the aqueous solution;

a solid electrolyte separating, in a gas and liquid-tight manner, the negative-electrode compartment from the positive-electrode compartment;

the method comprising the following successive steps:

(a) a discharging phase during which the lithium metal contained in the negative-electrode compartment oxidates and precipitates in the form of lithium hydroxide in the aqueous solution of the positive-electrode compartment;

(b) a recharging phase during which the lithium hydroxide solubilizes to release lithium ions which are reduced at the level of the negative electrode.

9. The battery of claim 2, wherein the solubility limit of lithium hydroxide in the aqueous solution containing the additive is between 1 mol/L and 2 mol/L.

10. The battery of claim 3, wherein the additive setting the solubility of the lithium ions is potassium hydroxide.

* * * * *